(12) United States Patent
Goddard

(10) Patent No.: US 9,743,807 B2
(45) Date of Patent: Aug. 29, 2017

(54) ENHANCED TONGS FOR SECURELY GRIPPING COOKED OR RAW FRUITS OR VEGETABLES WHILE EXPOSING MAXIMUM SURFACE AREA FOR PEELING

(71) Applicant: Jeffrey S. Goddard, Bridgeport, MI (US)

(72) Inventor: Jeffrey S. Goddard, Bridgeport, MI (US)

( * ) Notice: Subject to any disclaimer, the term of this patent is extended or adjusted under 35 U.S.C. 154(b) by 0 days.

(21) Appl. No.: 14/669,768

(22) Filed: Mar. 26, 2015

(65) Prior Publication Data
US 2016/0278579 A1  Sep. 29, 2016

(51) Int. Cl.
*B25B 7/00* (2006.01)
*B25B 9/00* (2006.01)
*A47J 43/28* (2006.01)

(52) U.S. Cl.
CPC .................................... *A47J 43/283* (2013.01)

(58) Field of Classification Search
CPC ...... B65G 7/12; B25J 7/00; B25B 9/02; A47J 43/283
USPC .......................................... 294/16, 99.1–99.2
See application file for complete search history.

(56) References Cited

U.S. PATENT DOCUMENTS

| | | | | |
|---|---|---|---|---|
| 5,649,728 A | * | 7/1997 | Warthen | A47G 21/10 294/16 |
| 6,056,338 A | * | 5/2000 | Kerr | A47J 43/283 294/106 |
| 6,092,847 A | * | 7/2000 | Kwan | A47G 21/10 294/106 |
| 8,308,208 B1 | * | 11/2012 | Blum | A47J 43/283 294/106 |
| 2009/0284031 A1 | * | 11/2009 | Pavicsits | A47J 43/283 294/16 |
| 2009/0322108 A1 | * | 12/2009 | Bina | A47J 43/28 294/99.2 |

* cited by examiner

*Primary Examiner* — Stephen Vu
(74) *Attorney, Agent, or Firm* — Russ Weinzimmer & Associates, PC

(57) ABSTRACT

Enhanced tongs are disclosed for holding and controlling a cooked or raw fruit or vegetable for peeling. The enhanced tongs include a pair of tong arms joined at a spring-biased pivot such that a gripping end of each tong arm faces a gripping end of the other tong arm. A set of gripping spikes located at the distal end of each tong arm projects inward towards the opposing set of gripping spikes. Each gripping spike can fully penetrate a fruit or vegetable without splitting the fruit or vegetable. The gripping spikes cooperate to hold a fruit or vegetable securely using a small portion of the fruit or vegetable so that the remaining majority of the fruit or vegetable surface can be peeled in a controlled manner.

14 Claims, 6 Drawing Sheets

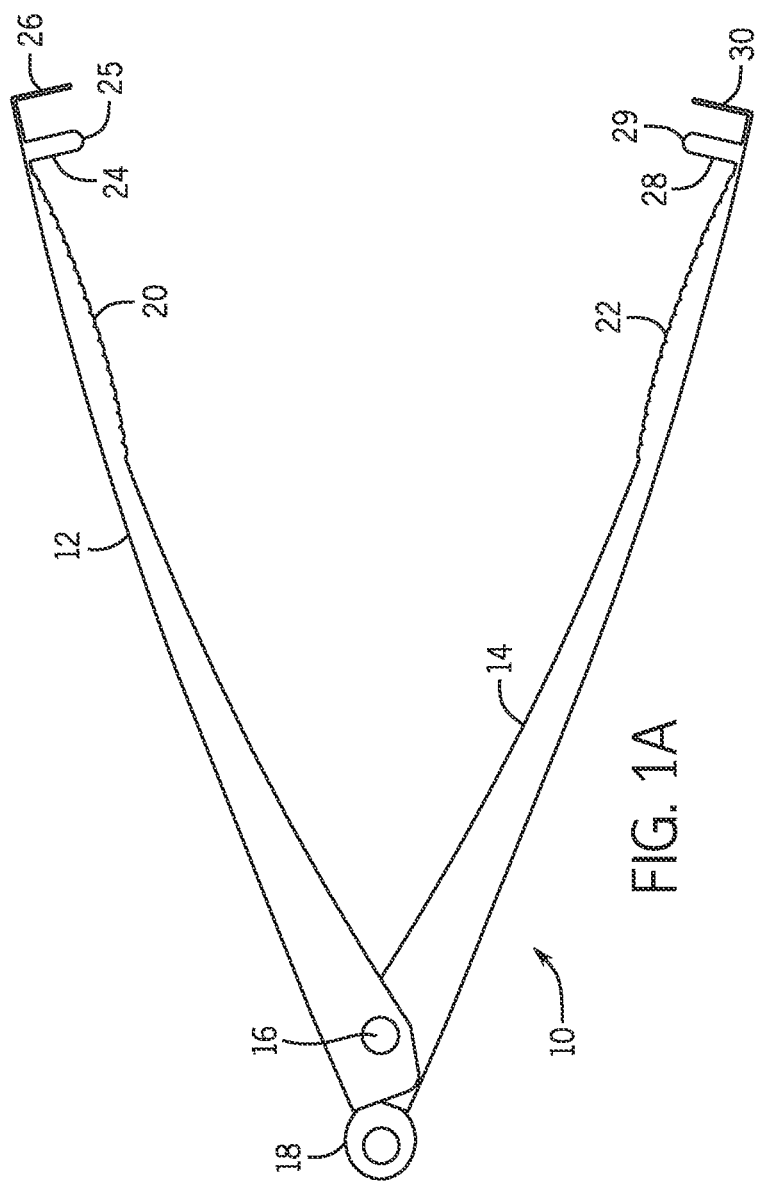
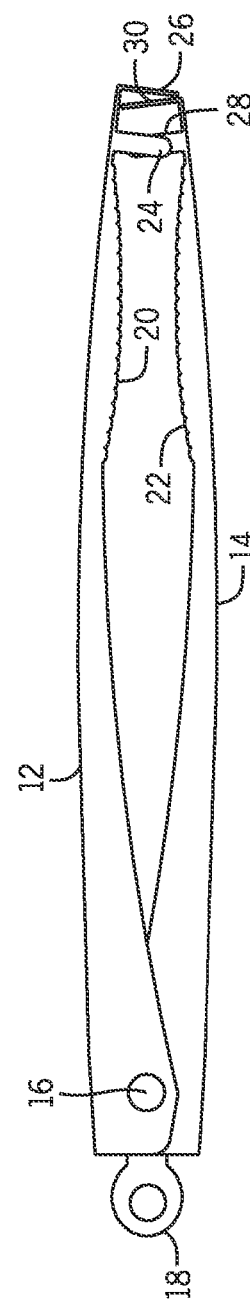
FIG. 1A
FIG. 1B

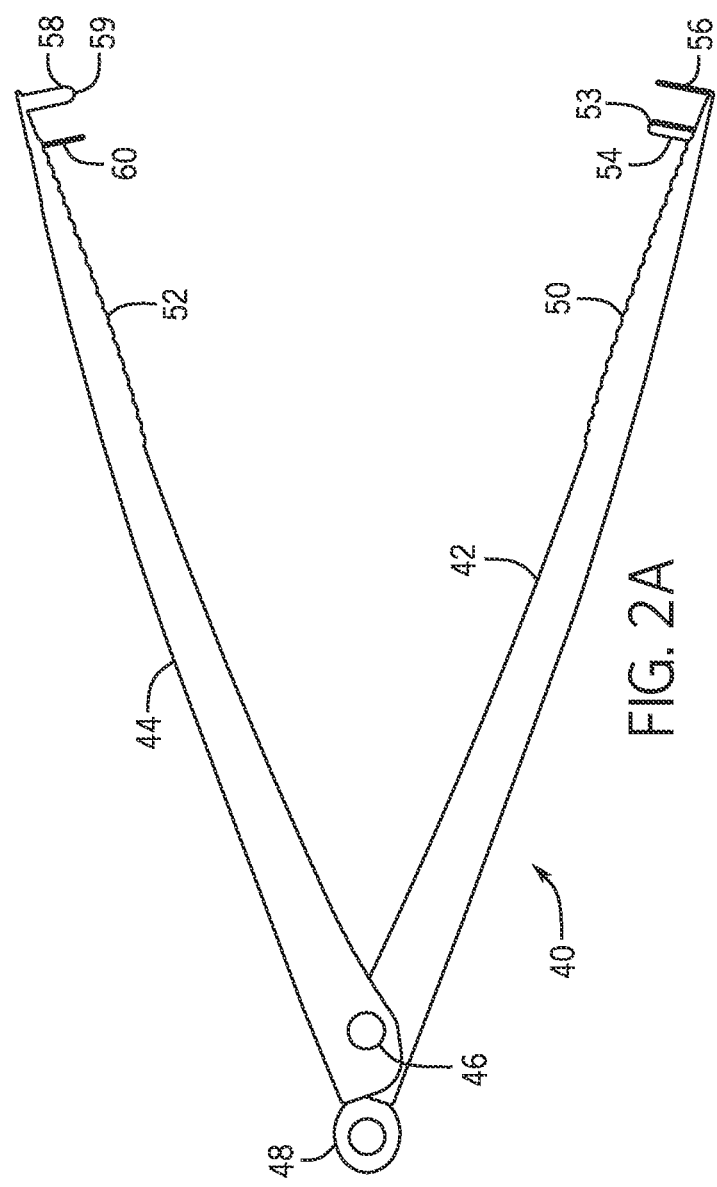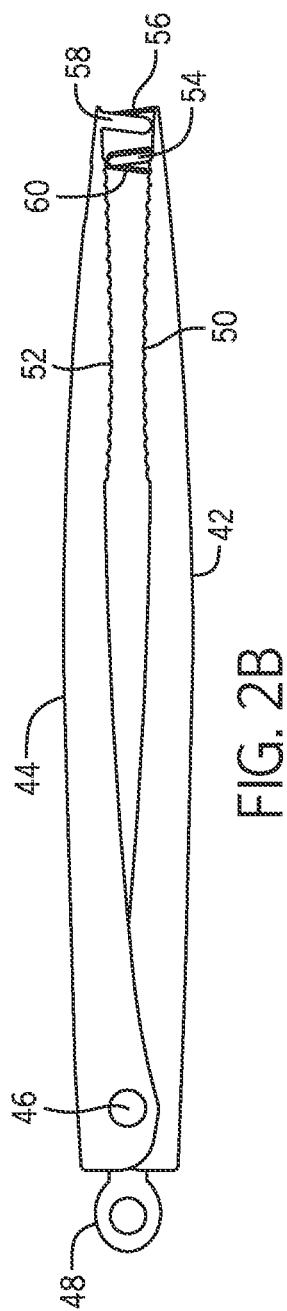

ENHANCED TONGS FOR SECURELY GRIPPING COOKED OR RAW FRUITS OR VEGETABLES WHILE EXPOSING MAXIMUM SURFACE AREA FOR PEELING

FIELD OF THE INVENTION

This invention relates generally to food handling devices, and more particularly to kitchen tongs.

BACKGROUND OF THE INVENTION

Tongs for handling food items are well known, and there are a wide variety of tongs available. In general, such tongs are directed at gripping and transferring food items from one place to another, such as from a barbecue grill to a plate. Some features have been provided to enhance the ability of the tongs to grasp the food items when affecting the transfer. Also, there are tongs for special additional uses, such as the cleaning of fish. Tongs for other purposes, such as the handling of blocks of ice, have also been developed, which have inward facing pointed hooks.

Tongs having a gripping portion with a circumferential jagged edge for gripping and transferring a raw or cooked fruit or vegetable, such as a cooked potato, are common. The gripping portion works best when most of the circumferential jagged edge makes contact with most of the fruit or vegetable.

However, such tongs cannot work well for peeling fruits and vegetables. For example, peeling a raw potato using tongs having a jagged circumferential edge around the gripping portion presents safety and control concerns, particularly when the potato needs to be grasped close to an end so as to expose a major portion of the potato for peeling. Attempting to grip the slippery peeled surface at the peeled end of the potato with such tongs increases the risk of losing control of the potato, and can result in injury and/or dropping the potato. This is also true for most fruits and vegetables, such as cucumbers, zucchini, mangos, kiwis, carrots, etc. Cooked or over-ripe fruits and vegetables can be even more challenging to grip while peeling.

The peeling of a raw potato, or other fruit or vegetable, by hand can be difficult and presents safety concerns, particularly when a portion that has already been peeled needs to be grasped to complete the peeling process. The slippery peeled surface increases the risk of cuts to the hand from a knife or peeler as the peeling process continues.

SUMMARY

The invention is a pair of enhanced tongs that can be advantageously used to firmly grasp a raw or cooked fruit or vegetable using only a small portion of the fruit or vegetable so as to leave a substantial portion of its surface exposed to peeling, while maintaining firm control of the fruit or vegetable, thereby not accidentally splitting or otherwise damaging the fruit or vegetable, and not injuring the person's hand using the enhanced tongs.

One general aspect of the invention is an enhanced tongs for gripping and peeling a cooked or raw fruit or vegetable. The enhanced tongs include: a pair of tong arms joined at a spring-biased hinge, each tong arm terminating in a concave grasping surface bounded by a peripheral grasping edge, each tong arm having a grasping surface extension that extends longitudinally from the peripheral grasping edge, each tong arm having at least one gripping spike that projects perpendicularly inward from the grasping surface extension, wherein at least one gripping spike from each tong arm can be made to non-destructively penetrate the fruit or vegetable when the pair of tong arms are squeezed towards each other, thereby securely gripping the fruit or vegetable while leaving most of the surface of the fruit or vegetable accessible for peeling.

In some embodiments, each gripping spike has a shape that allows easy penetration into a fruit or vegetable without splitting the fruit or vegetable.

In some embodiments, the gripping spike of one tong arm is offset with respect to the gripping spike of the other tong arm such that the gripping spikes do not meet when the tong arms are fully pressed together.

In some embodiments, each tong arm has three gripping spikes that project perpendicularly inward from the grasping surface extension. In further embodiments, the three gripping spikes are arranged to form an isosceles triangle.

In some embodiments, at least one gripping spike is formed by cutting and bending the grasping surface extension.

In some embodiments, at least one gripping spike is formed by welding the gripping spike to the grasping surface extension.

In some embodiments, at least one gripping spike has a rounded edge.

In some embodiments, each tong arm is made from at least one of: metal, wood, plastic.

Another general aspect of the invention is an enhanced tongs for gripping and peeling a cooked or raw fruit or vegetable, the enhanced tongs including: a pair of tong arms joined at a spring-biased hinge, each tong arm terminating in a concave grasping surface bounded by a peripheral grasping edge, each tong arm having at least one gripping spike that projects perpendicularly inward from the peripheral grasping edge, wherein the at least one gripping spike from each tong arm can be made to non-destructively penetrate the fruit or vegetable when the pair of tong arms are squeezed towards each other, thereby securely gripping the fruit or vegetable while leaving most of the surface of the fruit or vegetable accessible for peeling.

In some embodiments, each gripping spike has a shape that allows easy penetration into a fruit or vegetable without splitting the fruit or vegetable.

In some embodiments, the gripping spike of one tong arm is offset with respect to the gripping spike of the other tong arm such that the gripping spikes do not meet when the tong arms are fully pressed together.

In some embodiments, each tong arm has three gripping spikes that project perpendicularly inward from the peripheral grasping edge. In further embodiments, the three gripping spikes are arranged to form an isosceles triangle.

In some embodiments, at least one gripping spike is formed by cutting and bending the peripheral grasping edge.

In some embodiments, at least one gripping spike is formed by welding the gripping spike to the peripheral grasping edge.

In some embodiments, at least one gripping spike has a rounded edge.

In some embodiments, each tong arm is made from at least one of: metal, wood, plastic.

BRIEF DESCRIPTION OF THE DRAWINGS

The invention will be more fully understood from the following Detailed Description, in conjunction with the following figures, wherein:

FIG. 1A is a side view of a first embodiment of enhanced tongs in an open position, the first embodiment having a grasping surface extension for supporting a plurality of gripping spikes.

FIG. 1B is a side view of the first embodiment of enhanced tongs in a closed position.

FIG. 2A is a side view of a second embodiment of enhanced tongs in an open position, the second embodiment having a peripheral grasping surface bounded by a peripheral grasping edge, the peripheral grasping edge supporting a plurality of gripping spikes.

FIG. 2B is a side view of the second embodiment of the enhanced tongs in a closed position, showing both the top tong arm and the bottom tong arm, and how the gripping spikes from the top tong arm and the bottom tong arm come together cooperatively.

DETAILED DESCRIPTION

Figure 1C:
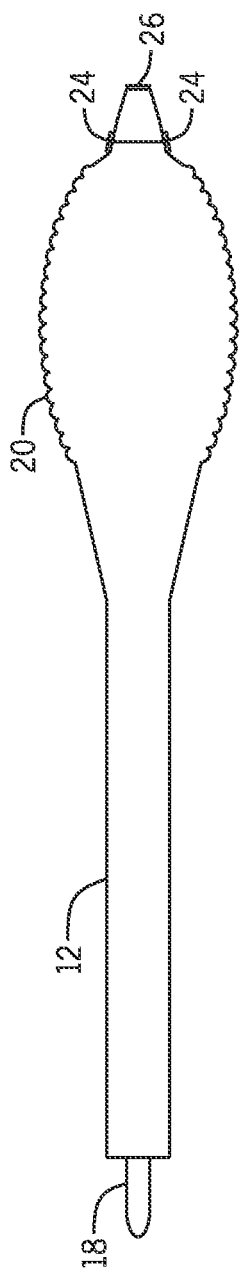
FIG. 1C is a top view of the top tong arm of the first embodiment of enhanced tongs with gripping spikes projecting down into the plane of the figure.

The enhanced tongs suitable for gripping and peeling a cooked vegetable or a raw vegetable, or a cooked fruit or a raw fruit, include two tong arms that can pivot towards each other, each tong arm presenting a set of gripping spikes at its distal end.

A first embodiment involves locating the gripping spikes on a grasping surface extension that extends longitudinally from the peripheral grasping edge that bounds a concave grasping surface at the distal end of each tong arm.

A second embodiment involves locating the gripping spikes on or near the peripheral grasping edge, without any grasping surface extension.

FIGS. 1A-1E illustrate the first embodiment using side and top views. The tongs 10 include two tong arms 12 and 14 that are joined at a pivot 16. Adjacent to the pivot 16 is a mechanism 18 that controls rotation of the tong arms 12 and 14 about the pivot 16. The mechanism 18 may involve a spring biasing mechanism that urges the tong arms 12 and 14 to rotate away from each other. Alternatively, the tong arms 12 and 14 can be biased to remain closed unless spread open. The mechanism 18 may include a locking mechanism that holds the tong arms 12 and 14 at a fixed distance from each other when activated, such as when the tongs have been closed on a potato embedding the gripping spikes into the potato. Also, the mechanism 18 may include a capability to keep the arms locked closed while stored. The tongs 10 can be stored on a hook via a hole in the mechanism 18.

Tong arm 12 has a concave grasping surface 20 at its end distal from the pivot 16, and tong arm 14 similarly has a grasping surface 22 at its end distal from the pivot 16. The two concave grasping surfaces 20 and 22 face each other. Tong arm 12 supports gripping spike pair 24 and gripping spike 26 on a grasping surface extension that extends longitudinally beyond its concave grasping surface 20, and tong arm 14 similarly supports gripping spike pair 28 and gripping spike 30 on a grasping surface extension that extends longitudinally beyond its concave grasping surface 22.

The gripping spikes 24 and 26 are offset with respect to gripping spikes 28 and 30, so that when the tong arms 12 and 14 are brought together by rotation about pivot 16, gripping spikes 24 and 26 cooperatively overlap gripping spikes 28 and 30. The gripping spikes 24, 26, 28, and 30 are dimensioned and shaped so that they can readily and non-destructively penetrate a cooked or raw vegetable or fruit, such as a raw potato. They have a generally rectangular configuration and a length of about one half inch. Gripping spike 24 has rounded end 25 and similarly gripping spike 28 has rounded end 29. For safety and convenience gripping spikes 26 and 30 may also have rounded ends, though that is not explicitly visible in FIG. 1A-1E. The gripping spikes 24, 26, 28 and 30 are configured to cooperate so as to securely hold a raw potato when the tong arms 12 and 14 have been rotated about the pivot 16 to fully embed the gripping spikes 24, 26, 28 and 30 into the potato, while leaving a substantial portion of the surface of the potato exposed for peeling.

Figure 1D:
FIG. 1D is a top view of the bottom tong arm of the first embodiment of enhanced tongs with gripping spikes projecting up from the plane of the figure.
Figure 1E:
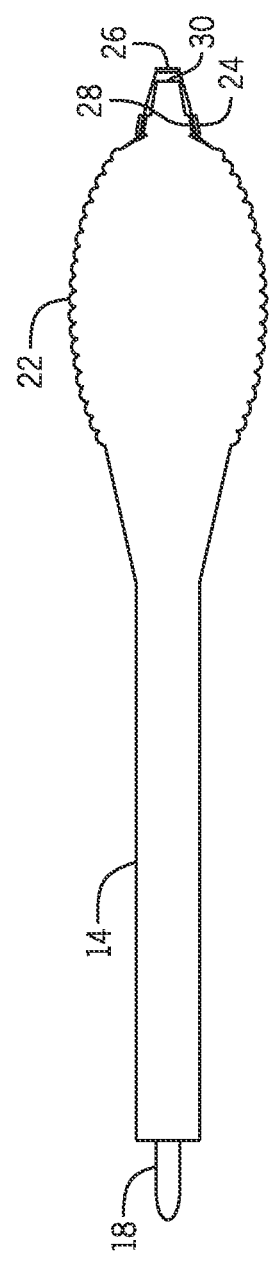
FIG. 1E is a bottom view of the first embodiment of the enhanced tongs in the closed position, showing the bottom tong arm over the top tong arm, and showing how the gripping spikes from the top tong arm and the bottom tong arm come together cooperatively, showing three gripping spikes from the bottom tong arm projecting upwards, and three gripping spikes from the top tong arm projecting downwards.

As best seen in FIG. 1C and FIG. 1D, each of the tong arms 12 and 14 has three gripping spikes 24 and 26, and 28 and 30, respectively, which are arranged in a triangular pattern. It has been found to be effective to use tongs with arms of a length of about 8⅛ inches from the center of the pivot 16 to the far end from which the gripping spike 26 projects. The gripping spikes are about ½ inch in height with a width of between 5/32 and 7/32 inches and a thickness of about 1/32 inch. The centers of gripping spikes 24 are about 0.46 inches from each other, and about 0.45 inches from the gripping spike 26, for example. The centers of gripping spikes 28 are about 0.34 inches from each other, and about 0.34 inches from the gripping spike 30. Thus, in each case, the gripping spikes are arranged in a triangular pattern, but other geometric patterns are possible when there are more or less than three spikes.

FIGS. 2A-2F show the second embodiment using side and bottom views. The tongs 40 include two tong arms 42 and 44 that are joined at a pivot 46. Adjacent to the pivot 46 is a mechanism 48 that controls rotation of the tong arms 42 and 44 about the pivot 46. The mechanism 48 can involve a spring biasing mechanism that urges the tong arms 42 and 44 to rotate either towards or away from each other. It can involve a locking mechanism that holds the tong arms 42 and 44 a fixed distance from each other when activated, such as when the tongs have been closed on a potato embedding the gripping spikes into the potato. Also, the mechanism 18 may include a capability to keep the arms locked closed while stored. The tongs 10 can be stored on a hook via a hole in the mechanism 18.

Tong arm 42 has a concave grasping surface 50 at its end distal from the pivot 46, and tong arm 44 similarly has a concave grasping surface 52 at its end distal from the pivot 46. The two concave grasping surfaces 50 and 52 face each other. Tong arm 42 has gripping spike pair 54 and gripping spike 56 at the end of its concave grasping surface 50 forming a triangle pattern, and tong arm 44 similarly has gripping spike pair 58 at the edge of its concave gripping surface 52, and gripping spike 60 forming an inverted triangle pattern.

The gripping spikes 54 and 56 are offset with respect to gripping spikes 58 and 60 so that when the tong arms 42 and 44 are brought together by rotation about pivot 46, gripping spikes 54 and 56 overlap gripping spikes 58 and 60. The gripping spikes 54, 56, 58 and 60 are dimensioned so that they can readily and non-destructively penetrate a cooked or raw vegetable or fruit, such as a raw potato. They have a generally rectangular configuration, and a height of about one half inch. Gripping spike 54 has rounded end 53, and similarly gripping spike 58 has rounded end 59. For safety and convenience, gripping spikes 56 and 60 can also have rounded ends, though that is not explicitly visible in FIGS. 2A-2F. The concave grasping surfaces 50 and 52 and the gripping spikes 54, 56, 58 and 60 are configured to cooperate to securely hold a raw potato when the tong arms 42 and 44 have been rotated about the pivot 46 to fully embed the gripping spikes 54, 56, 58 and 60 into the potato, while leaving a substantial portion of the surface of the potato exposed for peeling.

Figure 2C:
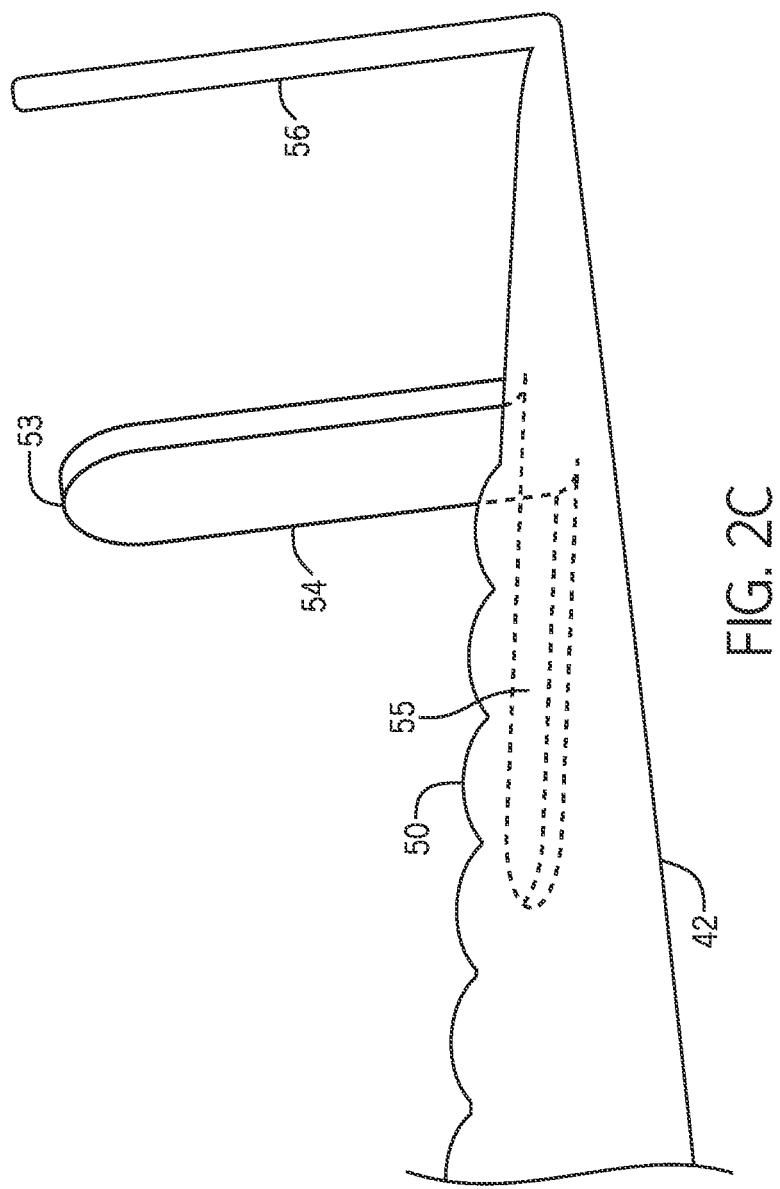
FIG. 2C is a cut-away side view of the distal end of the bottom tong arm of the second embodiment, showing two gripping spikes extending upward from the peripheral grasping edge.
Figure 2D:
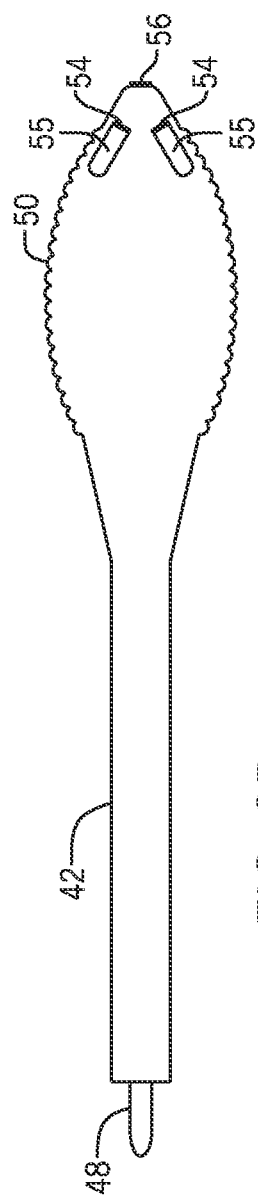
FIG. 2D is a bottom view of the enhanced tongs of FIG. 2A, showing from below the outside of the bottom tong arm of the second embodiment of the enhanced tongs with three gripping spikes projecting upwards towards the top tong, and into the plane of the figure.
Figure 2E:
FIG. 2E is a bottom view of the enhanced tongs of FIG. 2A, showing from below the inside of the top tong arm of the second embodiment of the enhanced tongs with three gripping spikes projecting downwards towards the bottom tong and out of the plane of the figure.
Figure 2F:
FIG. 2F is a bottom view of the enhanced tongs of FIG. 2B, showing from below the second embodiment of the enhanced tongs in the closed position, showing from below the outside of the bottom tong arm, and showing three gripping spikes projecting from the bottom tong arm towards the top tong arm, and showing two gripping spikes projecting from the top tong arm towards the bottom tong arm, cooperatively.

FIG. 2C shows the formation of gripping spike 54 by cutting its profile from the concave grasping surface 50, and then bending it away from this surface 50 leaving aperture 55. As best seen in FIG. 2D and FIG. 2E, each of the tong arms 42 and 44 has three gripping spikes 54 and 56, and three gripping spikes 58 and 60, respectively, which are arranged in a triangular pattern. Other geometric patterns are possible when there are more or less than three gripping spikes. It has been found effective to use tongs with a length of about 8⅛ inches from the center of the pivot 16 to the far end from which the gripping spike 56 projects. The gripping spikes are about ½ inch in height with a width of between 5/32 and 7/32 inches and a thickness of about 1/32 inch. The centers of gripping spikes 54 are about 0.34 inches from each other, and about 0.37 inches from the gripping spike 56. The centers of gripping spikes 58 are about 0.41 inches from each other, and about 0.35 inches from the gripping spike 60.

The placement of the pivot 16 or 46 adjacent to one end of the tong arms 12 and 14 or 42 and 44 is particularly convenient in grasping a potato. It allows the user more leverage in embedding the gripping spikes into the potato, and thereafter manipulating the potato. Typically the user grasps the tong arms 12 and 14 or 42 and 44 near the concave grasping surfaces 20 and 22 or 50 and 52, in essence choking up on the tongs.

The tongs can be made from metal, such as a ductile metal. This will facilitate the formation of the gripping spikes by cutting and bending appropriate portions of the tong arms. Such an approach will result in the gripping spikes having the same thickness as the tong arms have in these portions. The ductile metal should have sufficient strength to support a typical potato, and embed the gripping spikes into a raw potato. The steels commonly used in the fabrication of household utensils are suitable with an appropriate selection of design configuration and thickness. For instance, the tong arms can be configured with channels with walls generally perpendicular to the base of the tong arm to stiffen the arms against bending. They are conveniently made of flat stock of a thickness that can be readily cut and bent, but still providing appropriate resistance to deformation in use when grasping a fruit or a vegetable.

The gripping spikes can also be affixed to the peripheral grasping edge or to the grasping surface extension of the tong arms by any of the common techniques used in the fabrication of household tools. For instance, the gripping spikes could be affixed using welding. Alternatively, threaded holes can be created in the peripheral grasping edge or in the grasping surface extension of each tong arm at appropriate places, and a gripping spike can be screwed into each threaded hole therein.

The gripping spikes advantageously have a shape that gives them an ability to readily penetrate a raw potato, or other vegetable or fruit, without causing significant structural damage to the vegetable or fruit. It is useful for them to have the same thickness as the portion of the tong arms to which they are adjacent. This facilitates their formation by cutting and bending appropriate portions of the tong arms. Their width can be dictated by a trade-off between maximizing support to the secured vegetable or fruit, while also minimizing the size of the hole in the vegetable or fruit that is created by the embedding of the gripping spikes. Their height is generally between about one quarter and one half inch so as to provide a fruit or vegetable adequate resistance to the forces to which it is typically subjected when it is peeled.

The gripping spikes can be shaped so as to create holes in the potato of any geometric shape. Rectangles are effective if the gripping spikes are formed from the material of the tong arms, while circles or ovals can be effective if approximately cylindrical pieces are affixed to the tong arms to form the gripping spikes.

The gripping spikes can advantageously have a configuration such that their cooperation with the grasping surfaces of the tong arms results in securing a fruit or vegetable while exposing a significant portion of the surface of the fruit or vegetable so as to provide enhanced access by one desiring to peel the fruit or vegetable. It is advantageous if they are placed at or adjacent to the outer edge of the grasping surfaces. In some embodiments, there are three gripping spikes on each tong arm resulting in each being at the vertex of a triangle. In some embodiments, the triangle is isosceles or equilateral. In some embodiments, the gripping spikes on one tong arm are arranged to avoid being directly opposite those on the other tong arm as the tong arms are rotated towards each other. This avoids them inhibiting the full penetration of a thinner fruit or vegetable by meeting each other within the fruit or vegetable. It also facilitates the storage of the enhanced tongs in a closed position and the use of the tongs for other purposes. With appropriate placement and shaping of the gripping spikes, the tongs may also be used in the same manner as conventional kitchen tongs, thus adding to their utility.

Figure 3D:
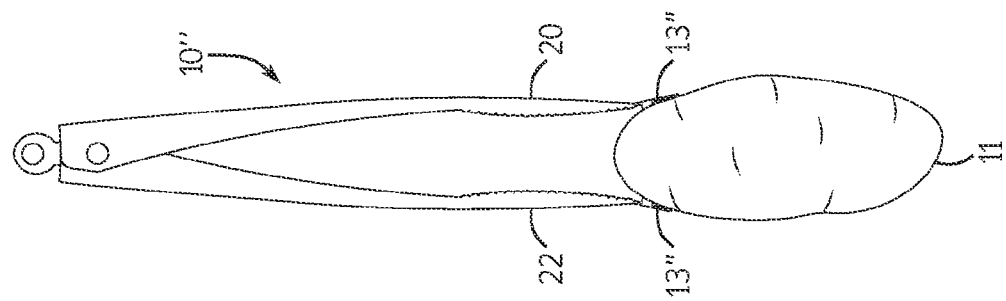
FIG. 3D is a side view of another alternate embodiment, shown gripping the potato positioned using the gripping spikes that project inward from the grasping surface extension so as to leave most of the surface of the potato exposed for peeling, the grasping surface extension being slightly angled outward.
Figure 3C:
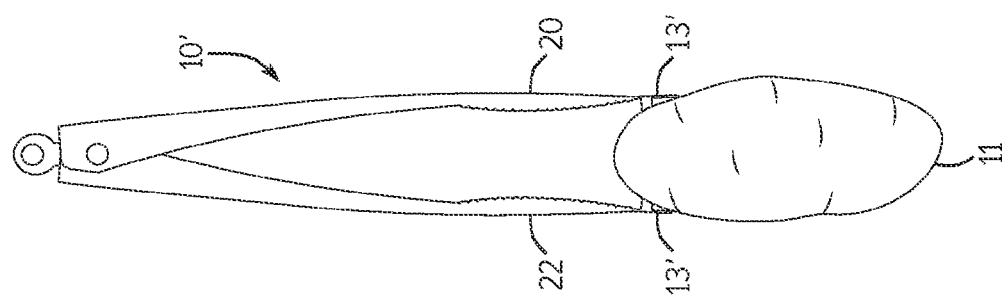
FIG. 3C is a side view of an alternate embodiment, shown gripping the potato positioned using the gripping spikes that project inward from the grasping surface extension so as to leave most of the surface of the potato exposed for peeling, the grasping surface extension extending straight out from the grasping surface.
Figure 3B:
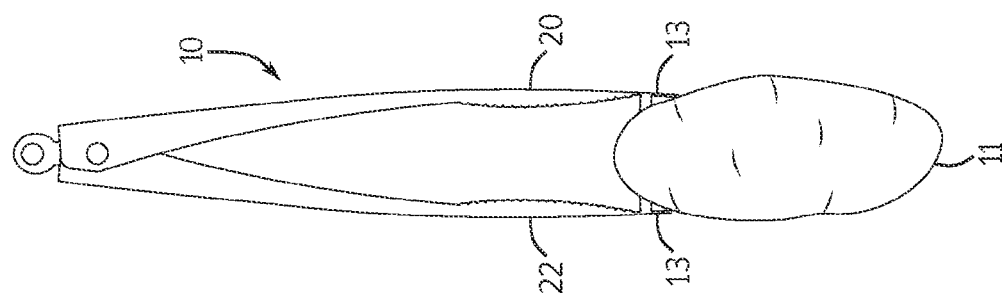
FIG. 3B is a side view of the enhanced tongs of FIG. 3A, shown gripping the potato positioned using the gripping spikes that project inward from the grasping surface extension so as to leave most of the surface of the potato exposed for peeling, the grasping surface extension being slightly angled inward.
Figure 3A:
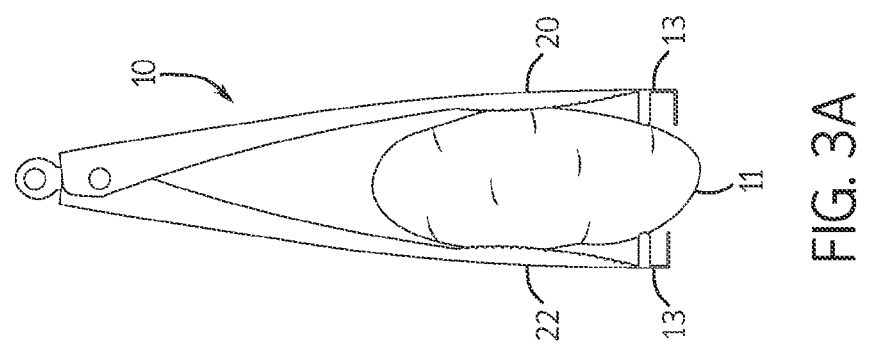
FIG. 3A is a side view of the enhanced tongs of FIGS. 1A and 1B, shown gripping a potato positioned so as to use only the concave grasping surface and the peripheral grasping edge, while NOT using the gripping spikes that project inward from the grasping surface extension, blocking peeling on two sides of the potato.

With reference to FIG. 3A, a raw unpeeled potato 11, for example, is shown being grasped by the enhanced tongs 10 of FIG. 1A using the concave grasping surfaces 20, 22. A substantial portion of the potato 11 is covered by the concave grasping surfaces 20 and 22, so it would be difficult to efficiently peel this potato while it is held in this manner. Notice that the gripping spikes of the grasping surface extensions 13 at the distal end of the enhanced tongs 10 are NOT engaged with the potato 11.

With reference to FIG. 3B, the raw unpeeled potato 11 is grasped by the enhanced tongs 10 so that it can be readily peeled. The tong arms 12, 14 have been pressed toward each other so as to fully embed the gripping spikes of the grasping surface extensions 13 into the potato 11. Notice that grasping surface extensions 13 are oriented at an angle that is a continuation of the angle of the concave grasping surfaces 20 and 22. After grasping the potato 11, a peeling device, such as a paring knife or a common potato or carrot peeler, can be applied to the accessible surface of the potato 11. It may be necessary to release and re-grasp the potato 11 to access its entire surface, but this maneuver is less necessary than if using only the concave grasping surfaces 20 and 22. The enhanced tongs can have a mechanism that can lock the tong arms against rotation about the pivot point that joins them.

Once the rotation of the tong arms has fully embedded the gripping spikes in the potato, this mechanism can be activated to facilitate holding the potato without having to exert pressure on the tong arms. While the gripping spikes have a tendency to remain embedded in the potato, it can be helpful to set the tongs down to attend to another task, and in such a case, this locking mechanism will help ensure that the gripping spikes remain embedded with the tongs locked in a somewhat closed position.

In another embodiment, the tongs have a mechanism that urges the tong arms to rotate away from each other about the pivot that joins them. This can be an appropriately placed biasing spring, which facilitates a single-handed application of the tongs to a potato, while the other hand can grasp the potato, or be uninvolved in process.

With reference to FIG. 3C, the raw unpeeled potato 11 is secured by enhanced tongs 10' so that it can be readily peeled. As before, the tong arms 12, 14 have been pressed toward each other so as to fully embed the gripping spikes of the grasping surface extensions 13' into the potato 11. Notice that in this alternate embodiment, the gripping extensions 13' are oriented at an angle that is slightly angled outward relative to the angle of the concave grasping surfaces 20 and 22.

With reference to FIG. 3D, the raw unpeeled potato 11 is secured by the enhanced tongs 10" so that it can be readily peeled. Again, the tong arms 12, 14 have been pressed toward each other so as to fully embed the gripping spikes of the grasping surface extensions 13" into the potato 11. Notice that in this additional alternative embodiment, the gripping extensions 13" are oriented at an angle that is even more angled outward than the angle in the embodiment of FIG. 3C.

Other modifications and implementations will occur to those skilled in the art without departing from the spirit and the scope of the invention as claimed. Accordingly, the above description is not intended to limit the invention, except as indicated in the following claims.

What is claimed is:

1. Tongs for gripping and peeling a cooked or raw fruit or vegetable, the tongs comprising:
    a pair of tong arms joined at a spring-biased hinge, each tong arm terminating in a concave grasping surface bounded by a peripheral grasping edge,
    each tong arm having a grasping surface extension that extends longitudinally from the peripheral grasping edge,
    each grasping surface extension having at least one gripping spike that projects perpendicularly inward from the grasping surface extension,
    each gripping spike being configured to non-destructively penetrate the fruit or vegetable when the pair of tong arms are squeezed towards each other, each gripping spike being configured to securely grip the fruit or vegetable while leaving most of the surface of the fruit or vegetable accessible for peeling.

2. The tongs of claim 1, wherein each gripping spike is configured to allow easy penetration into a fruit or vegetable without splitting the fruit or vegetable.

3. The tongs of claim 1, wherein the gripping spike of one tong arm is offset with respect to the gripping spike of the other tong arm such that the gripping spikes do not meet when the tong arms are fully pressed together.

4. The tongs of claim 1, wherein each tong arm has three gripping spikes that project perpendicularly inward from the grasping surface extension.

5. The tongs of claim 4, wherein the three gripping spikes are arranged to form an isosceles triangle.

6. The tongs of claim 1, wherein at least one gripping spike is formed by cutting and bending the grasping surface extension.

7. The tongs of claim 1, wherein at least one gripping spike is formed by welding the gripping spike to the grasping surface extension.

8. The tongs of claim 1, wherein at least one gripping spike has a rounded edge.

9. The tongs of claim 1, wherein each tong arm is made from at least one of: metal, wood, plastic.

10. Tongs for gripping and peeling a cooked or raw fruit or vegetable, the tongs comprising:
    a pair of tong arms joined at a spring-biased hinge, each tong arm terminating in a concave grasping surface bounded by a peripheral grasping edge,
    each tong arm having three gripping spikes that project perpendicularly inward from the peripheral grasping edge, and
    each gripping spike being configured to non-destructively penetrate the fruit or vegetable when the pair of tong arms are squeezed towards each other, each gripping spike being configured to securely grip the fruit or vegetable while leaving most of the surface of the fruit or vegetable accessible for peeling.

11. The tongs of claim 10, wherein each gripping spike has a shape that allows easy penetration into a fruit or vegetable without splitting the fruit or vegetable.

12. The tongs of claim 10, wherein the gripping spike of one tong arm is offset with respect to the gripping spike of the other tong arm such that the gripping spikes do not meet when the tong arms are fully pressed together.

13. The tongs of claim 10, wherein at least one gripping spike is formed by cutting and bending the peripheral grasping edge.

14. The tongs of claim 10, wherein at least one gripping spike is formed by welding the gripping spike to the peripheral grasping edge.

* * * * *